G. A. MEAD.
SUSPENSION DEVICE FOR TROLLEY WIRES AND THE LIKE.
APPLICATION FILED NOV. 12, 1906.
1,007,370.
Patented Oct. 31, 1911.
2 SHEETS—SHEET 1.
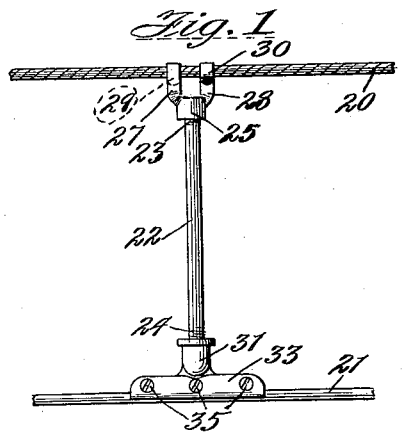
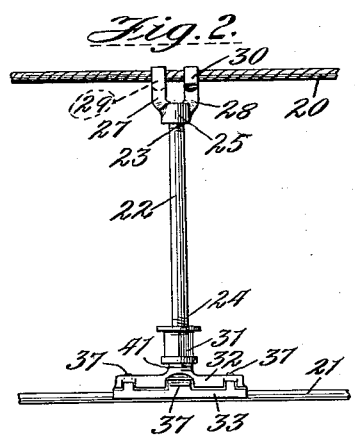
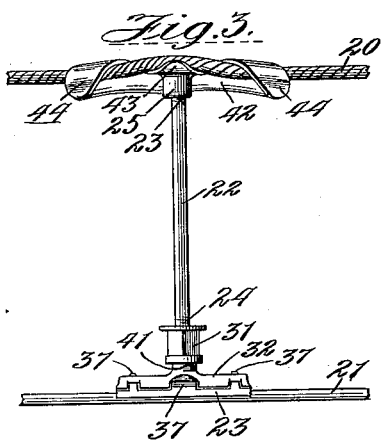
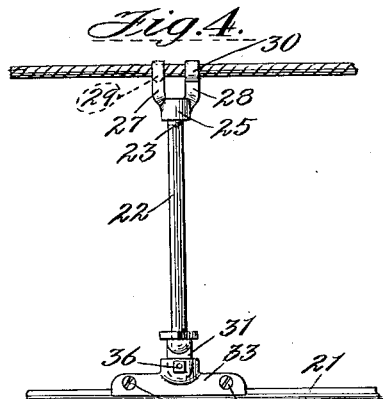

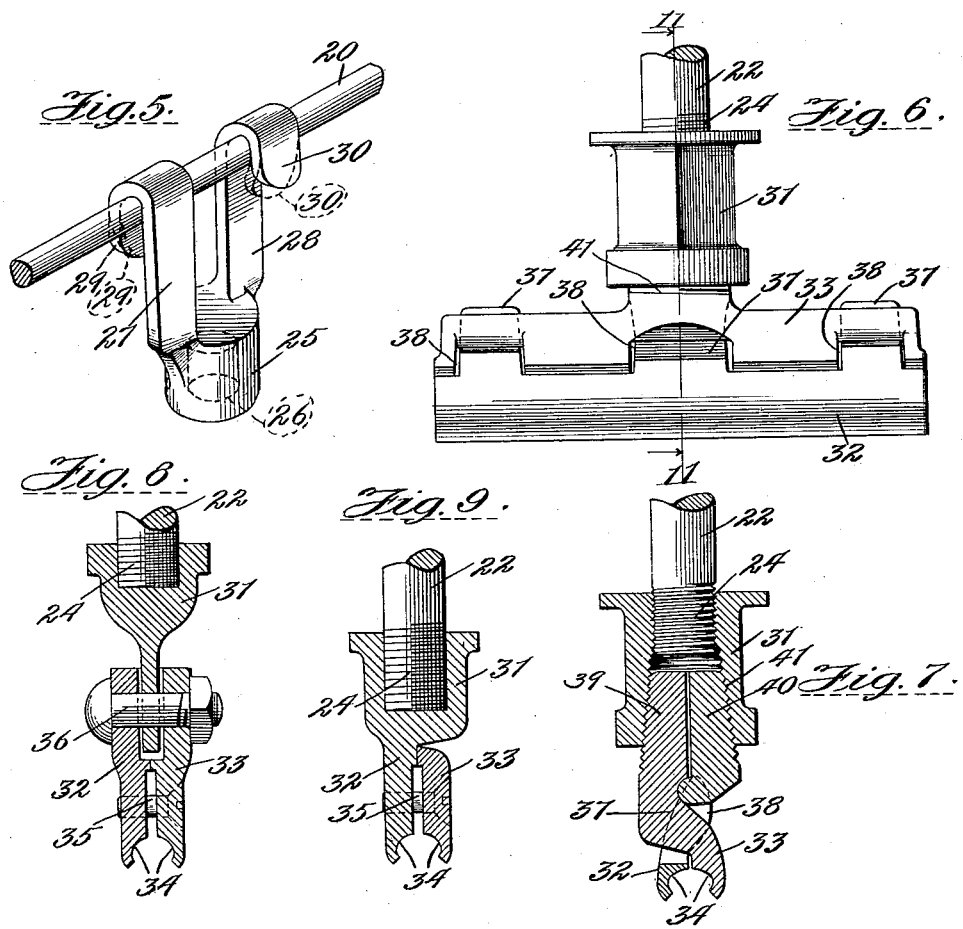

UNITED STATES PATENT OFFICE.

GEORGE A. MEAD, OF MANSFIELD, OHIO.

SUSPENSION DEVICE FOR TROLLEY-WIRES AND THE LIKE.

1,007,370.  Specification of Letters Patent.  Patented Oct. 31, 1911.

Application filed November 12, 1906. Serial No. 343,061.

*To all whom it may concern:*

Be it known that I, GEORGE A. MEAD, a citizen of the United States, residing at Mansfield, in the county of Richland and State of Ohio, have invented certain new and useful Improvements in Suspension Devices for Trolley-Wires and the Like, of which the following is a full, clear, and exact specification.

This invention relates to improvements in suspension devices for trolley wires and the like, and the object of the same is to provide an improved device of this character for flexibly suspending the trolley wire from a messenger wire.

A further object is to provide an improved adjustable or elastic support for the trolley wire.

A further object is to provide an improved flexible device of this character having interchangeable parts.

A further object is to provide an improved device of this character which will be simple and cheap in construction, easily applied and efficient in operation.

To the attainment of these ends and the accomplishment of other new and useful objects, as will appear, the invention consists in the feature of novelty in the construction, combination and arrangement of the several parts as will be hereinafter more fully described and claimed and shown in the accompanying drawings, illustrating the exemplification of the invention, and in which—

Figures 1, 2, 3 and 4 are views of various forms of this improved suspension device constructed in accordance with the principles of this invention. Fig. 5 is a perspective view of the suspension clip. Fig. 6 is an elevation of one form of clamp. Fig. 7 is a sectional view on line 11—11 of Fig. 6. Fig. 8 is a sectional view, similar to Fig. 7, of a modified form of clamp. Fig. 9 is also a similar sectional view of another modified form of clamp.

In the various exemplifications of the invention shown in the drawings, the same reference characters designate similar parts throughout the several views.

The numeral 20 designates the messenger wire from which the trolley wire 21 is suspended by suitable suspension devices or hangers arranged at suitable intervals along the messenger wire.

In the exemplification shown in Figs. 2, 3 and 4, the suspension device comprises a body portion 22, preferably in the form of a rod, having threaded extremities 23, 24, the threaded end 23 being connected to a suitable clip which removably engages the messenger wire 20, and connected to the end 24 is a suitable clamp which is adapted to grip the trolley wire 21.

The clip shown in Figs. 1, 2, 4 and 5 comprises a body portion 25 having a threaded aperture 26, and provided with upwardly projecting, spaced parallel arms 27, 28, arranged out of the same plane with each other and preferably on both sides of the aperture 26 to form an unobstructed space between the hooks. The free extremity of the arm 27 is bent into a hook-shaped portion 29, and the extremity of the arm 28 is also bent into a hook-shaped portion 30, and in a direction opposed to the direction of the hook-shaped portion 29. The body portion or member 22 is secured to the clip by inserting the threaded extremity 23 into the threaded aperture 26 in the body portion 25, and the lower threaded extremity 24 is adapted to be inserted into a threaded aperture in a suitable portion or member 31 of a suitable clamp. The suspension device is attached to the messenger or supporting wire 20, by turning the clip so that the arms 27, 28 will pass on each side of the wire 20, and when raised to the proper distance the clip may be then twisted so as to bring the hook-shaped portions 29—30 over the wire and when lowered the hook-shaped portions will pass over the wire 20, as shown more clearly in Fig. 5.

If desired, and in order to prevent the clip from being raised off of the messenger wire, or to prevent its slipping along the wire, the extremities of the hook-shaped portions 29, 30 may be deflected toward the respective arms 27, 28, or bent around the messenger wire, as shown in dotted lines in Fig. 5.

Any suitable form of wire clamp may be employed which preferably comprises two jaws or members 32, 33 having suitable recesses or grooves 34 for the reception of the wire 21, and having a threaded portion or member 31 adapted to receive the threaded extremity 24 of the member 22. In the exemplification shown in Figs. 1 and 9 the threaded portion 31 is integral with the jaw 32, and the jaw 33 is held in operative relation with the jaw 32 preferably by means of screws or bolts 35. In the exemplification shown in Figs. 4 and 8 the jaws 32 and 33 are held in operative position by means of the screws or bolts 35, and said jaws are pivotally connected to the threaded portion or member 31, preferably by means of a bolt 36. In the exemplification shown in Figs. 3, 6 and 7, the jaws are separate from each other and connected by means of suitable ears or lugs 37 on one of the jaws, passing through suitable apertures 38 in the other jaw or member. One of the ears or lugs 37 is provided with a threaded extremity 39 adapted to coöperate with a similar threaded ear or lug 40 on the other jaw, and when the two jaws are in operative position to clamp the wire 21, the threaded extensions 39, 40 will stand adjacent each other and be adapted to enter a threaded socket 41 in the member or portion 31, which latter holds the jaws in position, and also serves as a connection between the jaws and the body or member 22.

A modified form of clip is shown in Fig. 3, comprising a body portion 42 having a threaded portion 25 adapted to receive the threaded extremity 23 of the body or member 22, and is preferably provided with an upwardly projecting lug or ear 43 adjacent one side of its top face, preferably near the longitudinal center thereof. Projecting from the opposite side of the body 42 and located near the extremities thereof, and on both sides of the ear or projection 43, are ears or projections 44, which are bent over and spaced from the body portion 42. This form of clip may be applied to the messenger wire by hooking one of the ears or projections 44 over the wire, and then twisting the body portion 42 to cause the ear or projection 43 to pass under the wire 20 and then forcing the wire under the remaining ear or projection 44.

It will thus be seen that with such an arrangement, the trolley wire will be flexibly suspended from the messenger wire and owing to its construction it may be expanded or contracted to meet the required necessity by removing the member 22 and substituting therefor a similar member which may be either longer or shorter than the one removed so as to support the trolley wire at a proper height; thereby reducing the cost of manufacture by dispensing with the necessity of many expensive patterns, and other tools required for each individual length, which would be the case if all the parts were in one piece.

In order that the invention might be fully understood, the details of an embodiment thereof have been thus specifically described, but

What I claim is—

1. In a device of the class described, the combination of a messenger wire, a clip comprising a body portion and a plurality of oppositely disposed hook-shaped portions arranged to form an unobstructed space therebetween, said hook shaped portions projecting some distance above the body of the clip whereby the clip may be placed with the wire between the hooks and then turned to set the hooks in position with respect to the wire and then allowed to engage the hooks over the wire, a conductor wire, a clamp engaging said conductor wire, and a member connecting the clamp and clip for suspending the conductor wire, the extremities of said hooks being adapted to be deflected to grip the messenger wire.

2. In a device of the class described, the combination of a messenger wire, a clip comprising a body portion and a plurality of oppositely disposed hook-shaped portions arranged to form an unobstructed space therebetween, said hook-shaped portions projecting some distance above the body of the clip whereby the clip may be placed with the wire between the hooks, then turned to set the hooks in position with respect to the wire and then allowed to engage the hooks over the wire, a conductor wire, a clamp engaging said conductor wire and a connecting member detachably engaging the clamp and clip for suspending the conductor wire, the extremities of said hooks being adapted to be deflected to grip the messenger wire.

In testimony whereof I have signed my name to this specification, in the presence of two subscribing witnesses, on this 7th day of November A. D. 1906.

GEORGE A. MEAD.

Witnesses:
F. W. MILLER,
J. C. PAINTER.

Copies of this patent may be obtained for five cents each, by addressing the "Commissioner of Patents, Washington, D. C."